United States Patent Office 3,702,288
Patented Nov. 7, 1972

3,702,288
PROCESS FOR FINISHING METAL SUBSTRATES BY ELECTRODEPOSITING A PRIMER COMPOSITION AND APPLYING AN ACRYLIC ORGANOSOL COATING COMPOSITION
Anthony J. Erinjeri, Flint, Mich., assignor to E. I. du Pont de Nemours and Company, Wilmington, Del.
No Drawing. Filed Mar. 31, 1971, Ser. No. 129,961
Int. Cl. B01k 5/02; C23b 13/00
U.S. Cl. 204—181                                    17 Claims

ABSTRACT OF THE DISCLOSURE

The process of this invention for finishing metal comprises the following steps:
(1) Electrodepositing a primer coating of a carboxylic polymer on a metal substrate, washing the coated substrate and baking the coated substrate;
(2) Applying a sealer coat to the primed substrate and then a coating of an acrylic organosol lacquer and baking the coating to form a smooth, glossy finish having a high quality lacquer appearance.

The process is particularly useful for finishing automobile bodies and truck bodies.

BACKGROUND OF THE INVENTION

This invention relates to a process for finishing metal substrates, and in particular, to a process for applying a finish to automobile bodies and truck bodies.

Electrodeposition of primer coatings to metal substrates is well known as illustrated by Gilchrist U.S. Pat. 3,230,162, issued Jan. 18, 1966; Gilchrist U.S. Pat. 3,362,-899, issued Jan. 9, 1968 and Hart et al. U.S. Pat. 3,366,-563, issued Jan. 30, 1968. These prior art processes are acceptable for the electrodeposition of primer compositions to metal substrates but do not teach the application of a high quality acrylic organosol to these primed substrates.

Organosols are known in the art as shown by Thompson U.S. Pat. 3,382,297, issued May 7, 1968 and Duell et al. U.S. Pat. 3,383,352, issued May 14, 1968. Organosols of copolymers that utilize a graft copolymer to stabilize the organosol are known as taught by Schmidle et al. U.S. Pat. 3,232,903, issued Feb. 1, 1966, and Osmond U.S. Pat. 3,317,635, issued May 2, 1967. However, there is a great need in the automobile and truck industry for high quality coatings. The combined advantages of the electrodeposition of primer compositions along with the application of a high quality acrylic organosol would provide a particularly attractive process for the application of finishes to automobile bodies and truck bodies.

SUMMARY OF THE INVENTION

The process of this invention for finishing a metal substrate comprises the following steps:
(1) Electrodepositing a primer coating of a carboxylic polymer on a metal substrate by immersing the substrate in a coating bath of an electrocoating cell containing a cathode and where the metal substrate forms the anode of the cell, a direct current at about 50–600 volts is passed through the cell and a primer coating is deposited as a continuous film on the metal substrate, the coated metal substrate is removed from the bath, washed with water and baked at about 150–300° C.; the coating bath is an aqueous dispersion of film-forming constituents and has a solids content of 3–30% and a pH of about 7–9.5, the film-forming constituents consist essentially at least 50% by weight of a carboxylic polymer that has an acid number of 5–200, and correspondingly, up to 50% by weight of a cross-linking agent and the polymer is neutralized with a water-soluble basic compound;
(2) Applying a thin coating of a sealer composition;
(3) Applying a coating of an acrylic organosol lacquer over the sealer coating and baking the coating at about 110–200° C. to form a glossy, smooth finish about 1–5 mils thick; the acrylic organosol lacquer comprises about 10–60% by weight of film-forming constituents dispersed in an organic liquid wherein the film-forming constituents consist essentially of a graft copolymer having a backbone (A) and one or more side chains (B), the backbone (A) is a polymeric segment of units (a) and up to 15% by weight of units (b), the (b) units provide available grafting sites for graft polymerization, and each of the side chains (B) are polymeric segments, (A) and (B) are different from each other and (A) and (B) are each composed of at least 50% by weight of polymerized units of esters of acrylic acid, methacrylic acid and/or ethacrylic acid, provided that either (A) or (B) if prepared as a separate polymeric entity is substantially soluble in said organic liquid while the other of (A) or (B) if prepared as a separate polymeric entity is substantially insoluble in the same organic liquid.

DESCRIPTION OF THE INVENTION

In the novel process of this invention, the metal substrate which is being finished is immersed in an electrocoating cell in which the metal substrate forms the anode of the cell. A direct current of about 50–600 volts is passed through the cell and the primer coating in the bath of the cell is deposited as a continuous film on the metal substrate. Preferably, about 350–500 volts are used. When the primer coating reaches the desired thickness which is about 0.1–5 mils, preferably about 0.3–2 mils, the substrate is removed from the bath, washed with water and baked at about 150–300° C. for about 2 minutes to 2 hours to form a continuous primer coating on the metal substrate.

The coating bath utilized in the electrocoating cell has a solids content of about 3–30% and a pH of about 7 to 9.5 and contains as the film-forming constituents, preferably about 50–95% by weight of a carboxylic acid polymer having an acid number of 5–200, and correspondingly, about 5–50% by weight of a cross-linking agent. The polymer is neutralized with a water-soluble basic compound. The pH of the electrocoating bath is adjusted with a water-soluble basic compound and the pH can be controlled with an ultra-filtration unit which removes any excess of water soluble basic compound generated in the process.

One method for forming the electrocoating composition utilized in the bath for the electrocoating cell in the novel process of this invention is by mixing a film-forming polymer with a solvent which is miscible with water and dispersing this polymer solvent solution in water. The film-forming polymer is neutralized with a water-soluble basic compound, such as ammonium hydroxide, and amine, an alkali metal hydroxide, a basic alkali metal salt to form a dispersion of negatively charged polymer particles. This dispersion then can be reduced with water to the desired solids used in the bath of the electrocoating cell. For most applications, it is preferable to also disperse pigment particles in the aqueous dispersion. This composition is then used as a coating bath in a conventional electrocoating cell and when electric current is applied to this cell, the anionic polymer particles are deposited on the metal anode.

A wide variety of carboxylic acid polymers that have an acid number of 5–200 can be used as the film-forming polymer in the electrocoating composition. The following are typical examples of these carboxylic polymers which can be utilized in the novel process of this invention: alkyd resins, epoxy ester resin, acrylic resins, the reaction product of a dicarboxylic anhydride and a drying oil, epoxidized drying oils, styrene/allyl alcohol copolymers reacted with a maleinized drying oil fatty acid.

Preferably, about 5–50% by weight of a cross-linking agent is blended with the carboxylic polymer. However, some carboxylic polymers do not require the addition of a cross-linking agent, such as maleinized linseed oil, but even with these carboxylic polymers a cross-linking agent can be used and often is preferred to enhance the physical properties of the composition. Typical cross-linking agents which can be used in the electrocoating composition are, for example, melamine formaldehyde, alkylolated melamine formaldehyde in which the alkyl group has 1–4 carbon atoms, tetrakisethoxymethyl-bis-methoxymethyl melamine, urea formaldehyde, benzoguanamine formaldehyde, melamine toluene sulfamide resins and mixtures of these compounds, and other compounds, such as polyamines and polyhydroxyl terminated compounds which also act as cross-linking agents.

Typical alkyd resins which can be used in the electrocoating composition utilized in the novel process of this invention are the condensation products of a polyhydric alcohol and a polybasic acid. The following conventional drying oil fatty acids can be used to form these alkyd resins: tung oil, linseed oil fatty acids, soya bean oil fatty acids, dehydrated castor oil fatty acids and tall oil fatty acids.

Other polybasic acids or their anhydrides such as trimellitic, phthalic, maleic, sebacic, and adipic acids can be used with the aforementioned fatty acids to form useful alkyd resins. Trimellitic anhydride is a particularly useful constituent.

A variety of polyhydric alcohols can be used to form these alkyd resins, such as, glycerol, pentaerythritol, ethylene, glycol, propylene glycol, diethylene glycol, 1,5-pentanediol, hydrogenated bis-phenol A (4,4-isopropylidene, dicyclohexanol).

One useful alkyd resin is the esterification product of dehydrated castor oil fatty acids, trimelletic anhydride, 1,5-pentanediol and hydrogenated bis-phenol A.

The reaction product of anhydride of an unsaturated dicarboxylic acid and a conventional drying oil can also be used as the carboxylic film-forming polymer in the electrocoating composition. Typically useful anhydrides are maleic, itaconic, and the like. Any of the drying oils, such as tung oil, linseed oil, dehydrated castor oil and soya bean oil can be used in making this film-forming polymer. One preferred polymer is the reaction product of maleic anhydride and linseed oil.

Esterified epoxy resins can also be used as the carboxylic polymer in the electrocoating composition. One preferred epoxy resin is an epoxy hydroxy polyether resin esterified with a conventional drying oil fatty acid. These epoxy hydroxy polyether resins are condensates of chlorohydrin and bis-(4-hydroxy phenol)alkane with the preferred chlorohydrin being epichlorohydrin or glycerol chlorohydrin and the preferred alkane being bis-phenol A. These epoxy resins are well known under the trade name "Epon" resins. Esterification of these epoxy resins with conventional drying oil fatty acids can be accomplished according to the procedure described in Murphy U.S. Pat. 2,843,554, issued July 15, 1948. One particularly useful epoxy ester of this type is the esterification product of "Epon" 1004 and dehydrated castor oil fatty acids which is subsequently fully esterified with the reaction product of maleic anhydride and dehydrated castor oil.

Acrylic polymers can also be utilized as the carboxylic film-forming polymer in the electrocoating composition. Typically, these polymers are formed by polymerizing an $\alpha,\beta$-unsaturated carboxylic acid, with an ester of methacrylic acid and/or acrylic acid. In general, these acrylic polymers have a major portion of an alkyl ester of methacrylic acid and a minor portion of the alkyl ester of acrylic acid in which the alkyl group has 1–8 carbon atoms and contain about 0.1–5% by weight of the $\alpha,\beta$-unsaturated carboxylic acid, such as acrylic acid or methacrylic acid. The following are typically useful esters that can be used to form these acrylic polymers: ethyl acrylate, propyl acrylate, isopropyl acrylate, butyl acrylate, isobutyl acrylate, hexyl acrylate, 2-ethylhexyl acrylate, octyl acrylate, methyl methacrylate, propyl methacrylate, isobutyl methacrylate, butyl methacrylate, hexyl methacrylate and the like. Acrylamide can also be used to form these acrylic polymers. One useful polymer is methacrylic acid, acrylamide, methyl methacrylate and 2-ethylhexyl acrylate.

Polyesters of dicarboxylic acids and polyols can be used as the carboxylic film-forming polymer of the electrocoating composition utilized in this invention. Typical saturated aliphatic dicarboxylic acids or their anhydrides which can be used in forming these polyesters have 2–10 carbon atoms and are, for example, oxalic acid, malonic acid, succinic acid, glutaric acid, pimelic acid, suberic acid, azelaic acid, and sebacic acid and the like. Aromatic dicarboxylic acids of their anhydrides can also be used in forming these polyesters, such as phthalic acid, isophthalic acid, terephthalic acid and the like. Polybasic aromatic acids, such as trimellitic acid, pyromellitic acid, mellitic acid can also be used.

Typical polyols which can be used to form these polyesters are ethylene glycol, diethylene glycol, propylene glycol, dipropylene glycol, trimethylene glycol, 1,3-pentane diol 1-4 pentane diol, and 1,5-pentane diol. Polyols which contain more than 2 hydroxyl groups can also be used, such as glycerine, sorbitol, pentaerythritol, dipentaerythritol, trimethylolethane and trimethylolpropane. One useful polyester is the esterification product of trimellitic anhydride, adipic acid, phthalic anhydride, neopentyl glycol and trimethylol ethane.

Styrene/allyl alcohol copolymers can also be utilized in the electrocoating composition used in this invention. The styrene/allyl alcohol copolymers are generally reacted with a drying oil fatty acid which has been reacted with maleic anhydride. One typically useful copolymer is the reaction product of a copolymer of styrene/allyl alcohol, tall oil fatty acid, maleic anhydride.

The electrocoating composition preferably contains about 0.1–30% by weight pigments, such as carbon black, iron oxide, barium chromate, lead silicate, strontium chromate and the like. Surfactants may be added to disperse the film-forming polymer and the pigments and a water miscible solvent may also be used in the electrocoating composition.

Water-soluble basic compounds are used to neutralize the carboxylic polymer and adjust the pH of the electrocoating composition to a pH of 7 to 9.5, preferably, to a pH of 8–9. Typical compounds are: ammonium hydroxide, alkali metal hydroxide, such as sodium hydroxide, potassium hydroxide, and the like, primary amines, secondary amines, tertiary amines, polyamines, hydroxy amines and the like. The following are examples of useful compounds: monoethanolamine, diethanol amine, triethanol amine, n-methylethanol amine, n-aminoethylanol amine, monoisopropanol amine, hydroxyl amine, butanol amine, methyldiethanol amine, diethyl amine and the like.

The following are some of the many solvents which can be utilized in the electrocoating composition to aid in the dispersing of the polymer: diacetone alcohol, ethyl alcohol, acetone, methyl alcohol, ethylene glycol monoethylether, ethylene glycol monobutylether, cyclohexanol, butyl carbitol, carbitol acetate tetrahydrofuran, tertiary butyl alcohol, isopropyl alcohol and the like.

Preferably, the metal substrate which is electrocoated has been treated with a rust proofing composition which forms a phosphatized surface on the metal substrate. These compositions are aqueous solutions of phosphoric acid or salts of phosphoric acid.

After the metal substrate has been electrocoated and the primer has been washed and baked, the resulting primed substrate is coated with a sealer composition. The sealer composition can be applied by any of the conventional techniques, such as spraying, electrostatic spraying, dipping, brushing, flow-coating and the like. The sealer is then baked at 93–150° C. Under some conditions, it may be desirable to apply the acrylic organosol over a wet sealer coating. Some types of sealer compositions can be dried at room temperature but even for these compositions, baking is preferred to increase the drying rate. The resulting dried sealer coating is about 0.1–5 mils thick, preferably about 0.2–1.0 mil thick, and can be buffed or sanded to improve appearance or smoothness. A primer surfacer that is easily sanded can also be used. These primer surfacers have a high pigment content for example, pigment to binder ratio of 200:1 to 500:1 can be used.

A variety of sealer compositions can be used, such as those compositions disclosed in Sandstedt Ser. No. 783,399, filed Dec .12, 1968, now U.S. Pat. 3,627,779; Rohrbacher U.S. Pat. 3,509,086, issued Apr. 28, 1970; Jeffery et al. U.S. Pat. 3,505,269 issued Apr. 7, 1970; Swanson U.S. Pat. 3,272,647, issued Sept. 12, 1966; and Swanson U.S. Pat. 3,136,653, issued June 9, 1964.

One preferred sealer composition that can be dried at room temperature comprises 10–20% by weight of film-forming constituents that consist essentially of:

(1) About 50–70% by weight, based on the weight of the film-forming constituents, of an acrylic polymer consisting essentially of 90–99% by weight of methyl methacrylate, and correspondingly 1–10% by weight of 3-(2-methacryloxyethyl)-2,2-spirocyclohexyl oxazolidine; and correspondingly, (2) About 10–30% by weight, based on the weight of the film-forming constituents, of an epoxy resin having the following structural formula

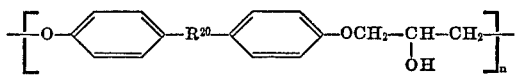

wherein $R^{20}$ is either

or —$CH_2$— and $n$ is a positive integer sufficiently large to provide the epoxy resin with a molecular weight of about 20,000 to 200,000; and (3) About 20–40% by weight, based on the weight of the film-forming constituents, of a phthalate ester plasticizer.

Other preferred sealer compositions other than those described in Rohrbacher U.S. 3,509,086 are those compositions that contain more than 50% by weight of the above described epoxy resin and less than 50% by weight of a copolymer of methyl methacrylate/3-(2-methacryloxyethyl)-2,2-spirocyclohexyl oxazolidine.

Application of the acrylic organosol lacquer

The acrylic organosol lacquer is applied to the sealer coating by any of the conventional means, such as spraying, electrostatic spraying, dipping, brushing, flow-coating and the like. The organosol lacquer can be applied over the sealer coating after it is dried or while the sealer coating is still wet. After application, the coating preferably is baked at about 110–200° C., preferably at about 125–175° C. for about 10–60 minutes. The resulting coating is about 1–5 mils in thickness and the coating can be rubbed or polished in accordance with conventional techniques to improve smoothness or gloss or both.

The acrylic organosol lacquer used in the novel process of this invention has a film-forming polymer solids content of about 10–60% by weight, and preferably, 20–40% by weight. The film-forming polymer is a graft copolymer represented by the recurring unit structure A–B, where A is the backbone segment of the molecular and B is a graft segment, attached to A by a chemical bond.

The A portion of the graft copolymer can be further represented by an a–b structure, i.e., the backbone is a copolymer composed of monomer units (a) and monomer units (b), where the (a) portion, i.e., the (a) monomer units, of the A segment is composed of monomer units from monomers of the general structure:

Formula 1

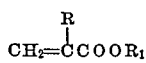

where R is H, $CH_3$ or —$CH_2CH_3$, and $R_1$ is an alkyl or cycloalkyl group of 1 through 18 carbon atoms.

These monomers are esters of acrylic acid, methacrylic acid and ethacrylic acid, lower alkyl methacrylates, where the alkyl group had 1–10 carbons being preferred with alkyls of 1–4 carbons, such as methyl methacrylate being especially preferred.

The (a) portion should constitute at least 85% by weight of the total A segment.

Although ordinarily the (a) portion will be composed entirely of these acrylic units referred to above, up to about 50% of its weight can consist of other monomers which do not contribute active grafting sites to the backbone. Illustrative of these are acrylic acid, methacrylic acid and their amides and nitriles; vinyl acetate; styrene; alpha-methyl styrene; vinyl toluene, 3-(2-methacryloxyethyl)-2,2-spirocyclohexyl-oxazolidine, and the like.

The (b) portion, i.e., the monomer units (b), of the A backbone segment provides the potential active grafting sites, i.e., points for attachment for the B branch segment or segments.

The (b) portion of the A segment, which comprises up to 15%, preferably 0.2–5%, even more preferably, 0.4–3%, by weight of the total A segment, can be any monomer units that provide available active grafting sites for graft polymerization. Representative of useful grafting site monomer units are those having the following general formula Formula 2

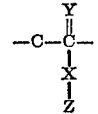

where X can be

(the carbon atom in this group being attached directly to the backbone), —O—, or

Y can be hydrogen, —$CH_3$ or —$CH_2CH_3$; Z can be

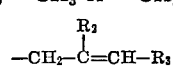

where $R_2$ and $R_3$ are Y

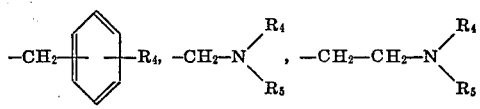

where $R_4$ and $R_5$ are H or alkyl of 1 through 4 carbon atoms, or

—$CH_2$—$CH_2$—O—$R_6$ where $R_6$ is alkyl of 1 through 4 carbon atoms;

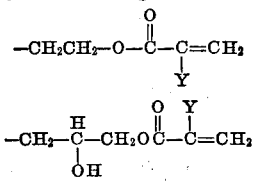

where Y has the same meaning as above;

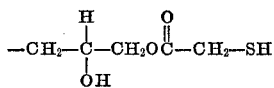

or

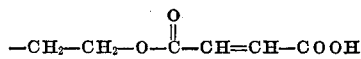

provided that when X is

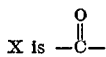

Z can be —H or —NH—CH$_2$—CH=CH$_2$ and provided further that the combined —X—Z group can be

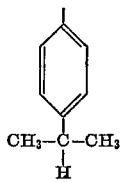

Allyl methacrylate and diethylaminoethyl methacrylate are preferred.

The B segment is the branch segment or branch segments of the graft copolymer. Like the (a) portion of the polymeric backbone segment A, and B segment of the graft copolymer molecule is composed of monomer units from monomers of the general structure of Formula 1 above.

As in the case of the (a) portion, the B portion of the graft copolymer molecule will ordinarily be composed entirely of acrylic units as mentioned above. However, up to about 50% by weight of the B portion can consist of other monomers which do not contribute active grafting sites to the backbone. Illustrative of these are acrylic acid, methacrylic acid and their amides and nitriles; vinyl acetate; styrene; alpha-methyl styrene; vinyl toluene, 3-(2-methacryloxyethyl)-2-spirocyclohexyl-oxazolidine, and the like.

Especially preferred B segments are composed of 2-ethylhexyl acrylate units, butyl acrylate units, or combinations of the two.

The B portion of the graft copolymer is always the branch segment and will not contain any significant amount of a component which provides active grafting sites such as previously indicated by (b).

As will readily be understood by persons in this art, preparation of graft copolymers described above will typically result in a mixture of polymer molecules, of varying number of grafted side chains per molecule. The average number of grafted B segments per A or backbone segment is ordinarily 0.5-5, preferably 1-2.

Although the backbone or A segment can be composed of the same general polymeric structure as the branch or B segment except for the (b) portion of A, the selection of the particular monomers used in the A and B segments of the graft copolymer should be such that either A or B, if prepared as a separate polymeric entity, is substantially soluble in the organic medium of the organosol, whereas, the other of A and B, if prepared as a separate polymeric entity, is substantially insoluble in the same organic medium. Therefore, in all instances, the backbone including grafting sites or (b) portion, must exhibit a distinct contrast in solubility with the branch segment. Thus, the organosol may have a soluble backbone and an insoluble graft or an insoluble backbone and a soluble graft for any given organic medium.

A segment is substantially soluble in a particular organic medium when, added as a separate polymeric entity, it will form a clear solution in this particular medium. A segment is substantially insoluble when, added as a separate polymeric entity, it will not form a clear solution in the organic medium irrespective of how much solvent is added.

Proper solubility parameter balance between the soluble and soluble segment of the graft copolymer used is important. To achieve maximum stability, the solubility parameter of the insoluble segment (determined as an entity) should differ from that of the soluble segment (determined as an entity). The solubility parameter of the soluble segment and continuous phase (everything in a liquid state) should be similar to achieve maximum stability.

It should be noted that solubility parameter of the soluble or insoluble segment taken as an entity is a single value. This value is obtained as a result of a simple algebraic relationship based on the solubility parameter of the monomers which form the polymeric entity and the ratio of the monomers to the total monomeric composition of the entity.[1]

Since the heat vaporization is a factor directly influencing the solubility parameter value, the solubility parameter is a value which is absolute and takes into account all the physical forces acting on any specific polymer.

A solubility parameter gradient between the insoluble segment of the graft copolymer and the soluble segment or continuous phase should be at least plus or minus 0.5 parameter unit, for an acceptable dispersion stability, preferably at least plus or minus 1.0 unit. A solubility parameter difference of less than 0.2 unit will lead to dispersions of markedly reduced stability.

The insoluble segment comprises from 20-95% by weight of the total A-B graft copolymer, preferably 65-90%. It will have a number average molecular weight of 10,000-450,000. Particular advantages are obtained, especially when the organosol is used as a coating composition, when the insoluble segment is at least about 50% by weight of the total graft copolymer. Best results in automotive finish applications are obtained when the insoluble segment is at least about 70% by weight of the total graft copolymer.

The soluble segment ordinarily constitutes from 5-80% by weight of the total graft copolymer, preferably 10-35%. The number average molecular weight of the soluble segment ranges from about 2,000-50,000.

The preparation of the graft copolymers of the organosol is accomplished by polymerizing the monomer of the graft copolymer in a good solvent, i.e., one in which both the individual backbone and graft segments and subsequent graft copolymers formed therefrom are soluble. Illustrative of such solvents which form a solution of the graft copolymer or segments thereof are esters, ketones and aromatic hydrocarbons, preferred good solvents are methyl ethyl ketone, xylene, ethylene glycol monomethyl ether, ethylene glycol monoethyl ether acetate, butyl carbitol, dimethyl phthalate, diethyl phthalate, diethyl adipate, hexalene glycol diacetate, ethylene glycol diacetone and diacetone alcohol.

In order to convert the graft copolymer solution to an organosol, an organic liquid of such solvency is added so that the resulting solvent mixture becomes a non-solvent or poor solvent for one of the segments of the graft copolymer but remains a solvent for the other segment.

This effectuates the conversion and produces the desired dispersion. Illustrative of such poor solvents are aliphatic hydrocarbons such as pentane, hexane, VM and P naphtha, petroleum ethers, aliphatic alcohols such as ethanol

---

[1] Solubility parameter of a substance =

$$\sqrt{\frac{(\text{Heat of Vaporization}) \times (\text{density})}{\text{Molecular Weight}}}$$

and propanol, Isopar-E, mineral spirits, dibutyl carbitol, butyl Cellosolve, and mixtures of these.

This partial solubility of the graft copolymer macromolecule produces the self-stabilization of the organosol. This does not preclude the use of external or other stabilizers, particularly when one operates close to the edge or self-stabilization of the system.

Preferably, the acrylic organosol is applied by spraying. In order to apply the film-forming graft copolymer to a substrate in a dual solvency system, the system can be prepared by the addition of suitable solvents which cause the organosol system to contain at least one poor solvent and at least one good solvent for the film-forming polymer as a whole.

The poor solvent or poor solvent mixture as a whole should be more volatile than the good solvent or good solvent mixture as a whole and will ordinarily have a mean boiling point (determined from its boiling range) falling within the limits of about 30° C. through 220° C., preferably 60–200° C.

The good solvent or good solvent mixture as a whole for the film former should be less volatile than the poor solvent or poor solvent mixture as a whole and should have a mean boiling point within the limits of about 50° C. through 350° C., preferably 80–320° C.

For optimum spray application, the weight ratio of good solvent to poor solvent should be 40/60 to 70/30. There should be present in the solvent blend an amount of a good solvent component equal to about 25–200% of the weight of total film-forming polymer present, which good solvent component has a weight average boiling point [2] at least about 10° C. higher than the mean boiling point of the poor solvent component having the highest boiling range, i.e., the poor solvent component which has the highest dry point.

The graft polymer particles in the acrylic organosol average from 0.05 micron to about 2 microns in diameter. The organosols are stable against settling and can remain in storage for extended periods without making, flocculating or coagulating.

Finishes of these acrylic organosols are durable, lustrous and have good buffiability, which makes them suitable for automotive and truck finishes. The high solids content permits the coating of an automobile to acceptable standards in two coats instead of the usual four, an obvious advantage.

The mixture of solvents previously referred to confers a unique advantage to the coating compositions. As a composition travels from the spray gun to the substrate being coated, the highly volatile poor solvent leaves the composition, which, as it travels, will contain progressively a higher concentration of the good solvent and will become more viscous. As the composition hits the substrate, it has a very high viscosity. This high degree of viscosity gives the composition a high sag resistance which, in combination with the high spray solids, allows a two coat application to give the same film thickness as the standard four coat application on automobiles.

The high level of viscosity also serves to immobilize metal flakes commonly used in automotive lacquers. This tends to eliminate mottling. The immobilization of the metal flakes occurs at a relatively low solids content which allows for a maximum amount of shrinkage which serves to orient the flakes and enhance glamour.

Shortly after the composition strikes the substrate and immobilization occurs, the viscosity of the composition takes a downward turn until the entire film has reverted to a solution. This viscosity drop permits the leveling of the film to occur. From this point, as further drying of the film occurs, the viscosity of the wet film again increases, further shrinkage occurs and the flakes become oriented.

[2] The weighted average boiling point is determined by multiplying the weight percent of each solvent component times its mean boiling point, adding the products and dividing by the total weight percent.

The conversion of what is basically a dispersion to solution form, and the accompanying peak and reduction in viscosity, takes place without precipitation or coagulation of the film-forming polymer particles because of the self-stabilizing character of the dispersion.

The graft copolymers used as film-formers in the acrylic organosols can be made by first preparing the A segment, the backbone. This is done by conventionally copolymerizing the (a) portion with the (b) portion. Suitable amounts of appropriate monomers are mixed together in an organic liquid in which the resulting backbone will be soluble, such as esters, ketones or aromatic hydrocarbons, together with from 0.1–2% by weight of a free radical polymerization initiator such as benzoyl peroxide, azobisisobutyronitrile or the like.

This mixture is then brought to the reaction temperature and maintained at this temperature until polymerization is 75–95% complete.

To the reaction mixture in one or more portions, appropriate amounts of the grafting monomer(s) and from 0.1–2% of a graft initiator such as t.-butyl peroxypivalate, t.-butyl peracetate, or benzoyl peroxide are then added. The reaction mixture is brought to its reflux temperature and held at this temperature until 90% conversion to the graft copolymer is obtained. This is determined by analysis for unreacted monomers.

Optionally, at this point, further addition of monomers can be made if desired for further polymerization with the graft copolymer or with any other monomeric or polymeric materials that may be present. Preferably, such monomers will be from the group of monomers used in formation of the non-grafting-site portion of the backbone. Most preferably, monomeric methyl methacrylate can be used at this stage.

Optionally, solutions of preformed compatible polymers can be added at this time to the reaction mass. For example, polymethyl methacrylate, cellulose esters such as cellulose acetate butyrate, polyvinyl acetate, etc., or mixtures thereof can be added.

The resulting reaction product is made into a stabilized organosol by the addition of a poor solvent (as previously defined) for the graft copolymer can be used directly to prepare coating compositions.

Pigmented organosol lacquers can be made by first preparing a pigment base. Examples of the great variety of pigments which are used in the organosol lacquers used in this invention are metallic oxides, preferably, titanium dioxide, zinc oxide, and the like, metal hydroxides, metal flakes, metal powders, chromates, such as lead chromates, sulfides, sulfates, carbonates, carbon black, silica, talc, china clay, iron blues, organic reds, maroons, and other organic dyes and lakes. A pigment base is prepared by conventional ball milling or sand grinding a mixture of appropriate amounts of pigment and graft copolymer film-former, either in solution or organosol form. Pigment is used in its ordinary meaning in this art to include organic or inorganic fillers and coloring materials, as well as metal flakes and other additives such as pigment dispersants. Especially useful pigment dispersants are disclosed in Ashe, U.S. patent application Ser. No. 92,949, filed Nov. 25, 1970, and U.S. patent application Ser. No. 39,532, filed May 21, 1970.

This pigment base is then added in appropriate amounts to the organosol, together optionally with up to about 50%, and usually from 15–30%, by weight of the film-forming polymer, of a suitable plasticizer. Any plasticizer which is relatively non-volatile and is compatible with the film-forming polymer will be satisfactory. Typical plasticizers are non-drying alkyd resins such as coconut oil modified ethylene glycol phthalate, low molecular weight polyesters such as neopentyl glycol adipate/benzoate, phthalate esters such as bis-(methylcyclohexyl) phthalate, etc. Mixtures of plasticizers also can be used. Butyl benzyl phthalate is one preferred plasticizer.

Clear coating compositions of this invention can be made utilizing the plasticizer or mixture of plasticizers as indicated above and omitting the pigment.

The followng examples illustrate the various aspects of the invention in greater detail. All parts and percentages are by weight.

EXAMPLE 1

The following ingredients are charged into a polymerization vessel:

| | Parts by wt. |
|---|---|
| Trimellitic anhydride | 238 |
| Dehydrated castor oil fatty acid | 229 |
| 1,5-pentanediol | 149 |
| Hydrogenated bisphenol-A (4,4'-isopropylidene dicyclohexanol) | 344 |
| Methylisobutyl ketone | 40 |
| Total | 1000 |

The ingredients are blanketed with nitrogen and the batch while under constant agitation is heated to about 140° C. The batch is then slowly heated to about 180–185° C. and maintained at this temperature for about 8 to 9 hours until an acid number of about 21 is reached. The batch is then cooled to room temperature.

The alkyd polymer has a molecular weight of about 1300 to 1400, an acid number of 21, and a Gardner Holdt viscosity measured at 25° C. in a 60% solids butyl Cellosolve solution of W.

The following ingredients are heated to about 80° C. and mixed to form a heat reactive resin blend of about 60% solids:

| | Parts by wt. |
|---|---|
| Alkyd polymer solution (96% solids) | 100.0 |
| Diacetone alcohol | 63.7 |
| Hexamethoxymethylolmelamine | 9.5 |
| Total | 173.2 |

A pigment dispersion is prepared as follows:

| | Parts by wt. |
|---|---|
| Heat reactive resin blend (60% solids) prepared above | 167 |
| Barium chromate | 19 |
| Total | 186 |

The ingredients are premixed and charged into a conventional ball mill and ground for 48 hours to a fineness of about 0.25 mil. The resulting pigment dispersion has a solids content of about 64%.

An electrocoating composition is then formed by mixing the following ingredients:

| | Parts by wt. |
|---|---|
| Pigment dispersion (64% solids) prepared above | 186 |
| Deionized water | 999.5 |
| N,N-dimethylethanolamine | 3.0 |
| Total | 1188.5 |

N,N-dimethylethanolamine is slowly added with a constant agitation to the pigment dispersion over a 15 minute period. Next, the water is preheated to about 70–80° C. and is slowly added to the mixture with constant agitation; after all the water is added, the mixture is agitated for about 1 hour. The pH of the composition is adjusted to about 7.8 to 8 with N,N-dimethylethanolamine.

Steel plates about 2 x 6 x 1/32 inches are treated on both sides with Bonderite 1000 which is believed to be essentially an aqueous solution of dilute phosphoric acid. The phosphoric acid etches the metal and a deposit of about 50 milligrams of iron phosphate per square foot of steel plate results. The treated steel plates are then washed with water and dried.

A galvanized steel tank having about a 700 ml. capacity is filled with electrocoating composition prepared above. The treated steel panel is positioned in about the center of the tank and forms the anode of the electrocoating cell while the tank itself forms the cathode of the cell. A DC voltage of about 250 volts is applied to the cell for about 3 minutes. A 1.1 mil thick coating is deposited on each side of the steel plate. The coating is slightly tacky but adheres well to the phosphatized steel substrate. The coated steel plate is washed, dried and baked at about 150° C. for 30 minutes. The resulting primer coating is smooth and free from imperfections, such as pin holes.

The sealer composition is prepared according to Example I A, Formula 2, of Rohrbacher U.S. 3,509,086 and diluted to a spray viscosity as in the example. The above prepared primed panel is then sprayed with the sealer and baked at about 200° C. for 30 minutes giving a sealer coating about 0.25 mil thick.

An acrylic organosol is prepared according to the following steps:

(1) 59.4 parts of butyl acrylate, 0.6 part of methacrylic acid, 90.0 parts of toluene, and 0.75 part of azobisisobutyronitrile are mixed and heated to 75° C. for 16 hours;

(2) The reaction mixture is then brought to reflux, held at reflux for 2 hours, and allowed to cool;

(3) A mixture of 0.41 part of glycidyl methacrylate, 0.06 part tetramethyl ammonium chloride, and 0.003 part of monomethyl ether of hydroquinone is added to 120.0 parts of the above reaction mixture and the resulting mixture is heated to 100° C. for 16 hours;

(4) Next a mixture of 48.0 parts of methyl methacrylate, 113.5 parts of toluene, and 0.144 part of azobisisobutyronitrile is added to 38.4 parts of the reaction mixture of step (3) and the resulting reaction mixture is then heated at 75° C. for 16 hours;

(5) 85.8 parts of ethylene glycol monoethyl ether acetate are added to 469.5 parts of the reaction mixture of step (4) and the mixture is heated in a steam bath and vacuum distillation of excess toluene is carried out at 220 mm. until 368.1 parts of the reaction mixture remains. This is followed by the addition of 21.9 parts of toluene;

(6) A mixture of 2.6 parts of ethylene glycol monoethyl ether acetate and 12.8 parts of hexane is added to 25.0 parts of the reaction mixture of step (5). An acrylic organosol lacquer (20.0% solids) of a graft copolymer having a polybutylacrylate backbone and a polymethyl methacrylate grafted segment is formed.

The above prepared acrylic organosol lacquer is sprayed onto the above prepared steel panels having an electrodeposited primer coating and sealer coating. Each panel is baked for about 30 minutes at 150° C. and results in a hard, fully cured film about 1.8 mils thick which in each case has particularly good adhesion to the sealer coating and has a high gloss, excellent hardness, is resistant to blistering by high humidity, has excellent resistance to water soaking, is highly chip resistant and is resistant to deterioration by weathering.

EXAMPLE 2

An electrocoating composition is prepared by blending the following ingredients:

| | Parts by wt. |
|---|---|
| Linseed oil maleic anhydride copolymer (Acid No. 170, Gardner Holdt viscosity of T at 25° C. measured at 75% polymer solids in xylene) | 32.66 |
| N-isopropyl-N'-phenyl-p-phenylene diamine | 0.21 |
| Diethylamine | 3.47 |
| Deionized water | 57.15 |
| Formaldehyde solution (37% formaldehyde in a water/methanol solution) | 0.11 |
| Total | 93.60 |

A mill base is then prepared by blending the following ingredients and then sand-grinding the ingredients in a conventional sand will to 0.5 mil fineness:

| | Parts by wt. |
|---|---|
| Linseed oil/maleic anhydride copolymer (described above) | 1.01 |
| Deionized water | 3.31 |
| Nonionic surfactant ("Witco" 912) | 0.10 |
| Carbon black pigment | 1.50 |
| Strontium chromate pigment | 0.48 |
| Total | 6.40 |

The mill base is then thoroughly blended with the above vehicle composition and this blend is then reduced to 7.0% solids with deionized water and the composition is then placed in a conventional electrocoating cell.

Steel panels are then immersed in the electrocoating cell as described in Example 1 and a direct current of 150 volts is applied for 90 seconds. The panels are removed and rinsed with deionized water and then baked for 30 minutes at 200° C.

The sealer composition described in Example 1 is then sprayed onto the panels as in Example 1 and the panels are baked at 200° C. for 30 minutes giving a sealer coating about 0.25 mil thick.

An acrylic organosol is prepared according to the following steps:

(1) 850.0 parts of methyl methacrylate, 7.0 parts of allyl methacrylate, 135.0 parts of toluene, and 210.0 parts of methyl ethyl ketone are mixed and heated to 90° C.;

(2) A mixture of 43.0 parts of methylethyl ketone and 3.3 parts of azobisisobutyronitrile is then added, the reaction mixture is heated to reflux and held at reflux for 17 minutes;

(3) A mixture of 1.2 parts azobisisobutyronitrile, 300.0 parts of methylethyl ketone, and 40.0 parts of toluene is then added over an 80-minute period;

(4) Then a mixture of 140.0 parts of 2-ethylhexyl acrylate, 0.6 part azobisisobutyronitrile, and 0.6 part t.-butyl peroxypivalate is added and the reaction mixture is brought to reflux and held at reflux for 10 minutes;

(5) Next, a mixture of 50.0 parts 2-ethylhexyl acrylate and 2.0 parts t.-butyl peroxypivalate is added over a 30-minute period followed by a 30-minute waiting period;

(6) 240.0 parts of Isopar-E, an isoparaffin boiling between 115–142° C., are mixed with 2.0 parts of t.-butyl peroxypivalate and this mixture is added to the reaction mixture over a 30-minute period, following by a 30-minute waiting period;

(7) 650.0 parts of Isopar-E are added to the reaction mixture over a 20-minute period and the reaction mass allowed to cool. The result is an organosol having 38.6% solids of a dispersed graft copolymer having a methyl methacrylate alkyl methacrylate backbone and a poly-2-ethylhexyl acrylate graft segment.

A pigmented acrylic organosol lacquer is then prepared as follows:

A pigment base is prepared by mixing 5.0 parts of ethylene glycol diacetate, 40.15 parts of ethylene glycol monoethyl ether acetate, 11.81 parts of isopropanol, 9.9 parts of methylethyl ketone, 18.6 parts of xylene, 44.48 parts of toluene, 50.0 parts of TiO₂, 8.0 parts of Indofast Yellow Greenish Toner, 6.0 parts of carbon black, 35.0 parts of iron oxide, and 161.06 parts of the solution form of the organosol prepared above. The resulting paste is sand ground in a standard sand mill to a 0.1 mil fineness;

11.0 parts of neopentyl glycol adipate/benzoate and 11.0 parts of an alkyd resin of coconut oil modified ethylene glycol phthalate plasticizer are added to the pigment base and mixed for 5 minutes;

185.1 parts of the above organosol is added and the mixture stirred for 5 minutes and is followed by addition of 5.98 parts of VM and P naphtha, 8.70 parts of hexane, and 4.02 parts of toluene and the resulting reaction mixture is blended for 30 minutes, which produces a yellow pigmented acrylic organosol lacquer.

This yellow pigmented lacquer is reduced to a spray viscosity by adding 108.80 parts of ethylene glycol monobutyl ether acetate, 16.48 parts of ethylene glycol diacetate, and 74.72 parts of VM and P naphtha to 296 parts of the acrylic lacquer. The above prepared lacquer is sprayed onto the above prepared steel panel having an electrodeposited primer coating and a sealer coat. Each panel is baked for about 30 minutes at 165° C. and results in a hard film about 1.8 mils thick which in each case has excellent adhesion to the sealer coating and has a high gloss, excellent hardness, is resistant to blistering by high humidity, has excellent resistance to water soaking, is highly chip resistant and is resistant to deterioration by weathering.

EXAMPLE 3

The following ingredients are blended together to form a vehicle for an electrocoating composition:

| | Parts by wt. |
|---|---|
| Epoxy ester copolymer [1] | 30.91 |
| N,N'-disecondary butyl paraphenol diamine | 0.16 |
| Potassium hydroxide | 1.55 |
| Butyl alcohol | 5.99 |
| Toluene | 1.23 |
| Xylene | 0.29 |
| Deionized water | 0.81 |
| Total | 89.11 |

[1] Epoxy copolymer is the reaction product of 14.62 parts by weight of "Epon" 1004, 7.06 parts by weight of dehydrated castor oil fatty acids, 6.85 parts by weight of linseed oil fatty acids, 2.38 parts by weight of maleic anhydride; the copolymer has an acid number of about 80. "Epon" 1004 has the following structural formula:

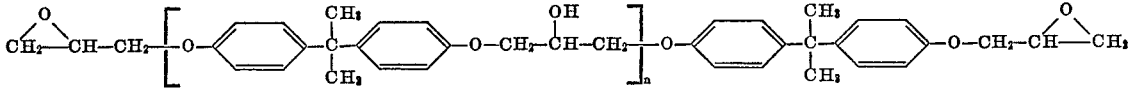

and has a melting point of 95–105° C., n is a positive integer sufficiently large to provide a Gardner Holdt viscosity of Q–U, measured at 40% solids in butyl carbitol at 25° C. and an epoxide equivalent of 875–1025, which is the grams of resin containing 1 gram equivalent of epoxide.

The following ingredients are blended together and ground on a conventional sand mill to 0.5 mil fineness to form a mill base:

| | Parts by wt. |
|---|---|
| Acrylic resin for flow control | 1.00 |
| Linseed oil fatty acids | 1.00 |
| Oeionized water | 0.81 |
| Potassium hydroxide | 0.23 |
| Titanium dioxide pigment | 7.27 |
| Iron oxide pigment | 0.18 |
| Carbon black pigment | 0.14 |
| Phthalocyanine blue paste (50% solids in deionized water) | 0.11 |
| Hydrous magnesium silicate | 0.15 |
| Total | 10.89 |

This mill base is thoroughly blended with the above prepared vehicle and the resulting mixture is reduced to 7.0% weight solids with deionized water to form an electrocoating composition.

The electrocoating composition is then placed in a conventional electrocoating cell described in Example 1 and steel panels are immersed in the electrocoating bath and electrocoated using a direct current at 150 volts for 90 seconds. The panels are removed from the electrocoating bath and rinsed with deionized water and baked for 30 minutes at 200° C.

The sealer composition described in Example 1 is sprayed onto each of the above prepared steel panels having an electrodeposited primer coating. Each panel is baked for about 30 minutes at 200° C. and the resulting sealer coating is about 0.25 mils thick.

An acrylic organosol is prepared by the following steps:

(1) 309.9 parts of methyl methacrylate, 3.2 parts of diethylaminoethyl methacrylate, 3.6 parts of allyl methacrylate, 48.4 parts of butyl acetate, and 75.3 parts of ethyl acetate are mixed and heated to reflux temperature;

(2) A mixture of 1.40 parts of azobisisobutyronitrile and 15.4 parts of ethyl acetate is then added and the reaction mass is held at reflux temperature for 10 minutes;

(3) A mixture of 0.43 part of azobisisobutyronitrile, 165.0 parts of ethyl acetate and 32.3 parts of butyl acetate is then added to the mixture over an 80-minute period;

(4) Then a mixture of 21.5 parts of 2-ethylhexyl acrylate, 0.21 part of azobisisobutyronitrile and 17.9 parts of aliphatic hydrocarbon is added to the reaction mixture and the reaction mixture is brought to reflux temperature and held at reflux for a 10-minute period;

(5) A mixture of 35.9 parts of 2-ethylhexyl acrylate and 0.36 part of t.-butyl peroxypivalate is then added over a 30-minute period and is followed by the addition over a 45-minute period of a mixture of 35.9 parts of methyl methacrylate, 0.43 part of t.-butyl peroxypivalate and 0.85 part of azobisisobutyronitrile;

(6) Next, 86.1 parts of aliphatic hydrocarbon and 0.21 part of t.-butyl peroxypivalate are mixed and added to the reaction mixture over a 30-minute period, followed by a 30-minute waiting period;

(7) 150.7 parts of aliphatic hydrocarbon are added to the reaction mixture over a 20-minute period and then cooling to give an organosol having 38.6% solids of a graft copolymer of methyl methacrylate/alkyl acrylate/diethylaminoethyl methacrylate backbone and a poly-2-ethylhexyl acrylate graft segment.

A pigment base is prepared by mixing 24.40 parts of the above organosol with 14.10 parts of VM and P naphtha, 14.05 parts of xylene, and 58.00 parts of TiO$_2$. The resulting paste is ground in a conventional sand mill to a 0.1 mil fineness.

110.55 parts of this pigment base are added with stirring of a blend of 186.52 parts of the above organosol, 18.00 parts of bis-(methyl cyclohexyl)phthalate plasticizer, 17.90 parts xylene and 18.03 parts of VM and P naphtha.

The resulting white pigmented organosol lacquer is reduced to a spray viscosity by adding 80 parts of ethylene glycol monobutyl ether acetate, 49 parts of xylene and 49 parts of VM and P naphtha to each 222 parts of the lacquer.

The above prepared lacquer is sprayed onto the above prepared primed and sealed panels. Each panel is baked for about 30 minutes at 165° C. and results in a finish which in each case has excellent adhesion to the sealer coat and has a high gloss, excellent hardness, is resistant to blistering by high humidity, has excellent resistance to water soaking, is highly chip resistant, and is resistant to deterioration by weathering.

EXAMPLE 4

An electrocoating vehicle composition is formulated by blending the following ingredients:

| Portion 1: | Parts by wt. |
|---|---|
| "Methylon" cross-linking agent [1] | 15.2 |
| Pentoxone solvent (4-methoxy-4-methyl-pentanone-2) | 32.39 |
| Cresylic acid | 2.39 |
| Copolymer resin solution [2] | 262.21 |
| Portion 2: | |
| Deionized water | 115.54 |
| Triethyl amine | 10.48 |
| Portion 3: | |
| Deionized water | 390.26 |
| Total | 828.39 |

[1] Having the formula:

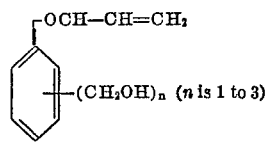

[2] Copolymer resin solution: 90% polymer solids in a pentoxone solvent in which the polymer has an acid number of about 40. The polymer reaction product of 1238 parts by weight tall oil fatty acid, 965 parts by weight of styrene/allyl alcohol copolymer in a 1:1 ratio, and is maleinized with 143 parts by weight of maleic anhydride.

Portion 1 is premixed and then Portion 2 is added and the ingredients are thoroughly blended. Portion 3 is then slowly added and thoroughly blended and the resulting composition has a total solids content of about 30.3%.

A mill base is formed as follows:

| Portion 1: | Parts by wt. |
|---|---|
| Deionized water | 388.03 |
| Linseed oil/maleic anhydride copolymer (described in Example 2) | 204.79 |
| Diethylamine | 34.57 |
| Portion 2: | |
| Nonionic surfactant ("Witco" 912) | 9.31 |
| Lead silicate pigment | 93.09 |
| Strontium chromate pigment | 46.54 |
| Iron oxide pigment | 797.87 |
| Total | 1574.20 |

Portion 1 is thoroughly mixed for about 20 minutes and then Portion 2 is added and the ingredients are thoroughly mixed and charged into a ball mill then ground to a fineness of 7 Hegmans and filtered with a 25 micron American felt cartridge. The resulting mill base has a solids content of 73.1% and a pigments solids content of 60.6%.

An electrocoating composition is formed by blending 4.2 parts by volume of the above prepared mill base with 51.4 parts by volume of the above prepared vehicle composition and thoroughly mixed. The resulting composition is diluted with deionized water to a 7% solids content and the resulting electrocoating composition is charged into a conventional electrocoating cell described in Example 1.

Steel panels are immersed in the electrocoating cell and coated using 150 volts direct current for 90 seconds. The panels are removed and washed with deionized water and baked for 30 minutes at 200° C.

The sealer composition described in Example 1 is sprayed onto each of the above prepared panels having an electrodeposited primer coat. Each panel is baked for about 30 minutes at 200° C. and the resulting sealer coating is about 0.25 mil thick.

A blue acrylic organosol lacquer according to the following procedure:

Pigment dispersant: (A) 226.7 parts of toluene are charged into a steel reaction vessel, heated to reflux temperature and held at this temperature. A solution of 226.7 parts of methyl methacrylate, 126 parts of 2-ethylhexyl acrylate, 90.7 parts of toluene, 4.44 parts of 2-mercaptoethanol and 0.903 part of azobisisobutyronitrile is then slowly added to the vessel over a four hour period.

While the reaction mixture is maintained at its reflux temperature, a solution of 0.25 part of azobisisobutyronitrile in 2.5 parts of methyl isobutyl ketone is added in three equal portions at fifteen minute intervals. A water separator is attached to the reaction vessel and the solution is refluxed for another forty-five minutes.

(B) Desmodur N [3] (43.21 parts) is then added to the reaction mixture and its container rinsed with 3.78 parts of toluene, which was also added to the mass. The mixture is stirred for five minutes.

Dibutyltin dilaurate (0.51 part) is then added and its container rinsed with 1.89 parts of toluene, which was also added to the mixture and this solution is refluxed for one hour.

(C) The solution is then cooled to about 65° C. and stirred as a solution of 17.09 parts of mercaptosuccinic acid in 120.9 parts of methylethyl ketone is added. The container is rinsed with 3.78 parts of methylethyl ketone, which is also added to the solution. After thirty minutes of stirring at 60–75° C., 0.85 part of acetic anhydride is added.

The resulting product is a solution having a 48% solids content of a polymeric material of the general formula of VM and P naphtha are then added and mixed for 30 minutes. The final mixture was then ground 2 passes in a conventional sand mill.

Phthalocyanine blue pigment mill base: 24.9 parts xylol and 20.7 parts of the aforementioned pigment dispersant are added to a ball mill and blended for 5 minutes. 10.0 parts of phthalocyanine blue pigment are added and then the mixture is blended for 10 minutes in the ball mill. 27.3 parts of VM and P naphtha are then added, the resultant mixture is ball milled for 48,000 cycles and dropped into a holding tank. 8.3 parts of VM and P naphtha, 8.3 parts of xylol and 0.5 part of the pigment dispersant are added to the ball mill, blended one hour, dropped into the holding tank and mixed.

Carbon black pigment mill base: 7.0 parts of xylol and 48.0 parts of the pigment dispersant are mixed for 10 minutes and then 20.0 parts of carbon black pigment are added and then mixed for 30 minutes. 5.0 parts of the organosol of Example 3 are then added and mixed for 10 minutes. Finally, 20.0 parts of VM and P naphtha are added and mixed for 30 minutes, the resultant mixture is ground two passes in a conventional sand mill.

An acrylic organosol lacquer is prepared as follows:

(1) 0.01 part of the white pigment mill base, 0.96 part of the carbon black pigment mill base, 1.03 parts of the monastral blue pigment mill base, 1.43 parts of the aluminum mill base, 5.26 parts of the phthalocyanine blue pigment mill base and 0.93 part of the red pigment mill

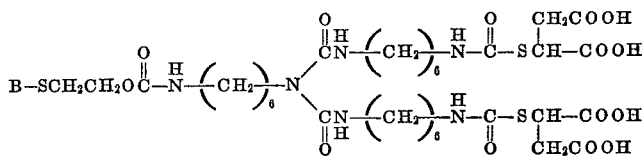

where B is a MMA/2EHA copolymeric segment.

White pigment mill base is prepared as follows: 14.5 parts of the aforementioned pigment dispersant and 9.9 parts of xylol are mixed together for 15 minutes. 5.0 parts of mineral spirits are added and the mixture is blended for one hour. 58.0 parts of $TiO_2$ pigment are then added followed by 20 minutes of stirring and 2.5 parts of the organosol prepared in Example 3 are added and the resultant mixture is ground one pass in a sand mill.

Red pigment mill base is prepared as follows: A mixture of 17.0 parts VM and P naphtha, 18.0 parts of xylol and 25.0 parts of the aforementioned pigment dispersant are blended for one hour in a ball mill. 25.0 parts of thiofast red like pigment are added and the resultant mixture blended for an additional hour in a ball mill. 4.5 parts of the organosol prepared in Example 3 are added to the mixture and the mixture is ground in a ball mill for 24,000 cycles. 2.0 parts of VM and P naphtha, 3.5 parts xylol and 5.0 parts of pigment dispersant are added and the resulting mixture is blended for one hour in a ball mill.

Aluminum mill base: 20.0 parts of the aforementioned pigment dispersant are mixed with 12.5 parts of aluminum paste for one hour. 57.4 parts of the organosol of Example 3 are then added and the resultant mixture is blended for an additional 2½ hours.

Monastral blue pigment mill base: 20.7 parts of the aforementioned pigment dispersant are mixed with 19.5 parts of xylol for 10 minutes. 20.0 parts of monastral blue pigment are added and the resultant mixture is mixed an additional 60 minutes. 20.8 parts of xylol and 19.0 parts

[3] Desmodur N: Hexamethylene diisocyanate biuret.

base are blended together and thoroughly mixed for 30 minutes;

(2) 83.14 parts of the organosol of Example 3 are then added to the above mill base mixture and blended for 30 minutes;

(3) 2.24 parts of neopentyl glycol, 2.37 parts of an alkyd resin of coconut oil modified ethylene glycol phthalate plasticizer, and 1.98 parts of butyl benzyl phthalate are then added to the mixture of (2) and blended for 30 minutes;

(4) 0.03 part of a silicone solution having a solids content of 600 parts per million are added to the mixture of (3) and mixed for 30 minutes;

(5) 7.30 parts of xylol and 7.30 parts of mineral spirits were incrementally added to the mixture of (4) over a 3-hour period while the mixture is under constant agitation. The resultant mixture is blended for an additional 1 hour. The resulting product is a metallic blue automotive lacquer having a 28.00% solids content.

The above lacquer is reduced to a spray viscosity using the identical ingredients in the identical amounts as in Example 3. This lacquer is sprayed onto the above prepared steel panels having an electrodeposited primer coat and a sealer coat. Each panel is baked for about 30 minutes at 165° C. and results in a hard finish which in each case has excellent hardness, is resistant to blistering by high humidity, has excellent resistance to water soaking, is highly chip resistant, and is resistant to deterioration by weathering.

EXAMPLE 5

Steel panels are electrocoated with the primer composition of Example 4 utilizing the identical procedure of Example 4 and the panels are then washed and baked for 30 minutes at 200° C.

A primer surfacer composition is prepared by first forming a mill base which then is blended with other constituents. The mill base is prepared as follows:

| | Parts by wt. |
|---|---|
| Epoxy ester resin solution (45% polymer solids of "Epon" 1004/dehydrated castor oil fatty acids resin) | 12.570 |
| Nuosperse 657 | 0.620 |
| Creosol solution (10% solids) | 0.660 |
| Ethylene glycol monobutyl ether | 3.660 |
| Butanol | 2.930 |
| Heavy mineral spirits | 8.660 |
| Black iron oxide pigment | 8.980 |
| Aluminum silicate | 11.290 |
| Barytes pigment | 37.550 |
| Titanium dioxide pigment | 4.590 |
| Alkyd resin solution (55% solids of an alkyd resin of dehydrated castor oil/glycerine/ethylene glycol/phthalic anhydride) | 2.510 |
| Hydrocarbon solvent (boiling point 182–219° C.) | 4.230 |
| Mineral spirits | 1.750 |
| Total | 100.000 |

The above ingredients are blended together and charged into a conventional sand mill and ground to a 0.1 mil fineness.

The primer surfacer is prepared by blending the following ingredients:

| | Parts by wt. |
|---|---|
| Mill base (prepared above) | 82.0 |
| Alkyd resin solution (described above) | 5.5 |
| Epoxy ester resin solution (described above) | 2.5 |
| Urea formaldehyde solution (60% solids in butanol) | 1.9 |
| Ethylene glycol monoethyl ether acetate | 4.3 |
| Mineral spirits | 3.8 |
| Total | 100.0 |

The above primer surfacer composition is reduced to a spray viscosity and sprayed onto the above primed steel panels and the panels are baked for 30 minutes at 200° C. The resulting primer surfacer coating is about 0.75 mil thick and can be easily sanded.

The blue automotive lacquer prepared in Example 4 is reduced to a spray viscosity and applied to the panels and the panels are baked at 165° C. for about 30 minutes. The resulting finish has properties similar to those described in Example 4.

I claim:

1. A process for finishing a metal substrate which comprises
   (1) electrodepositing a primer coating of a carboxylic polymer on the metal substrate by immersing the substrate in a coating bath of an electrocoating cell containing a cathode and where the metal substrate forms the anode of said cell, passing a direct current at about 50 to 600 volts through said cell and depositing a primer coating of a continuous film on the substrate, removing the coated substrate from the bath, washing the coated substrate with water and baking the coated substrate at about 150–300° C.;
      wherein the coating bath comprises an aqueous dispersion of a film-forming constituent and has a solids content of 3 to 30% and a pH of 7 to 9.5 wherein the film-forming constituents consist essentially at least 50% by weight of a carboxylic polymer having an acid number of 5–200 and correspondingly up to 50% by weight of a cross-linking agent and the polymer is neutralized with a water-soluble basic compound;
   (2) applying a thin coating of a sealer composition;
   (3) applying a coating of an acrylic organosol lacquer over the sealer coating and baking the coating at about 110° C.–200° C. to form a glossy smooth finish about 1–5 mils thick;
      wherein the acrylic organosol lacquer comprises about 10–60% by weight of film-forming constituents dispersed in organic liquid wherein the film-forming constituents consist essentially of a graft copolymer comprising a backbone (A) and one or more side chains (B), the backbone (A) being a polymeric segment of units (a) and (b) with (b) being no more than 15% by weight, said (b) units providing available active grafting sites for graft polymerization, and each side chain (B) above being a polymeric segment, (A) and (B) being different from each other, and (a) and (B) each being composed of at least 50% by weight of units of esters of acrylic, methacrylic and/or ethacrylic acid, provided that such that either (A) or (B) if prepared as a separate polymeric entity, is substantially soluble in said organic liquid, whereas, the other of (A) or (B), if prepared as a separate polymeric entity, is substantially insoluble in the same organic liquid.

2. The process of claim 1 in which the primer coating and the acrylic organosol lacquer each contain 0.1–30% by weight of pigment particles.

3. The process of claim 2 in which the graft copolymer of the organosol lacquer consists essentially of units (a) and (B) that are formed from monomers of the general structure

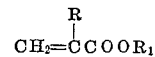

where

R is H, $CH_3$ or $-CH_2CH_3$, and
$R_1$ is an alkyl or cycloalkyl group of 1 through 18 carbon atoms;

with (a) and (B) being up to 50% of other monomers which do not contribute active grafting sites and the
   (b) monomer units which provide potential active grafting sites having the general structure

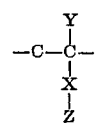

where

X can be

(the carbon atoms in this group being attached directly to the backbone), $-O-$, or

Y can be hydrogen, $-CH_3$ or $-CH_2CH_3$; Z can be

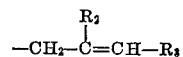

where $R_2$ and $R_3$ are Y

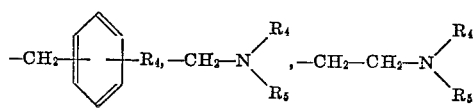

where $R_4$ and $R_5$ are H or alkyl of 1 through 4 carbon atoms, or $$-CH_2-CH_2-O-R_6$$

where $R_6$ is alkyl of 1 through 4 carbon atoms;

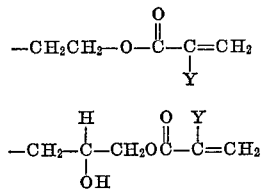

where Y has the same meaning as above;

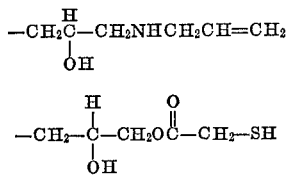

or

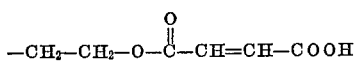

provided that when X is

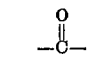

Z can be —H or —NH—$CH_2$—CH=$CH_2$ and provided further that the combined —X—Z group can be

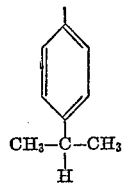

and wherein the (A) segment and the (B) segment have a solubility parameter difference of at least 0.5 parameter unit and wherein the insoluble segment of either (A) or (B) has a number average molecular weight of 10,000 to 450,000 and the soluble segment of either (A) or (B) has a number average molecular weight of 2,000 to 50,000.

4. The process of claim 3 wherein $R_1$ of the graft copolymer is an alkyl group having 1 through 10 carbon atoms and wherein said organic liquid is a mixture of
   (a) a poor solvent or poor solvent mixture for the film forming polymer having a mean boiling point falling within the limits of 60–200° C., and
   (b) a good solvent or good solvent mixture for the film forming polymer having a mean boiling point falling within the limits of 80–320° C.,
the (b) solvent being less volatile than the (a) solvent, the weight ratio of (b) to (a) being 40/60 to 70/30.

5. The process of claim 4 in which the sealer composition is highly pigmented.

6. The process of claim 4 wherein the sealer composition consists essentially of
   (a) about 50–95% by weight of a high molecular weight epoxy resin having a molecular weight of about 20,000 to 200,000, and
   (b) about 5–50% by weight of an adhesion promoting acrylic polymer.

7. The process of claim 6 in which the carboxylic polymer is an epoxidized drying oil.

8. The process of claim 6 in which the carboxylic polymer is a styrene/allyl alcohol copolymer reacted with maleic anhydride and a drying oil fatty acid.

9. The process of claim 6 in which the carboxylic polymer is an alkyd resin.

10. The process of claim 6 in which the carboxylic polymer is a maleinized drying oil.

11. The process of claim 10 in which the carboxylic polymer is a linseed oil/maleic anhydride copolymer having an acid number of 150–200 and is neutralized with a secondary amine.

12. The process of claim 6 in which the carboxylic polymer is an epoxy ester.

13. The process of claim 12 in which the epoxy ester is a polymer of a polyhydroxy epoxy ether resin, dehydrated castor oil fatty acids and linseed oil fatty acids.

14. The process of claim 6 wherein the acrylic polymer of the sealer composition consists essentially of methyl methacrylate and 3-(2-methacryloxy-ethyl) - 2,2 - spirocyclohexyl oxazolidine.

15. The process of claim 14 in which the graft copolymer of the acrylic organosol lacquer the (a) monomer units of the (A) segment consists of methyl methacrylate; and the (b) monomer units of the (A) segment consists of allyl methacrylate and diethylaminoethyl methacrylate and the monomer units of the (B) segment consists of 2-ethylhexyl acrylate.

16. The process of claim 14 in which the graft copolymer of the acrylic organosol lacquer the (a) monomer units of the (A) segment consists of methyl methacrylate and the (b) monomer units of the (A) segment consists of allyl methacrylate and diethylaminoethyl methacrylate and the monomer units of the (B) segment consist of 2-ethylhexyl acrylate and butyl acrylate.

17. A ferrous metal substrate having about 0.1–5 mils of a pigmented primer layer which has been electrodeposited and a dried coalesced sealer layer in superposed adherence with said primer layer and a dried coalesced layer about 1–5 mils in thickness of the acrylic organosol lacquer of claim 2.

References Cited
UNITED STATES PATENTS

| | | | |
|---|---|---|---|
| 3,230,162 | 1/1066 | Gilchrist | 204—181 |
| 3,232,903 | 2/1966 | Schmidle et al. | 260—33.6 |
| 3,317,635 | 5/1967 | Osmond | 260—881 |
| 3,362,899 | 1/1968 | Gilchrist | 204—181 |
| 3,366,563 | 1/1968 | Hart et al. | 204—181 |
| 3,382,297 | 5/1968 | Thompson | 260—875 |
| 3,383,352 | 5/1968 | Duell | 260—33.6 |

HOWARD S. WILLIAMS, Primary Examiner